G. C. KAIL.
AUTOMATIC GAS SHUT-OFF VALVE.
APPLICATION FILED JUNE 7, 1915.
1,218,089.
Patented Mar. 6, 1917.
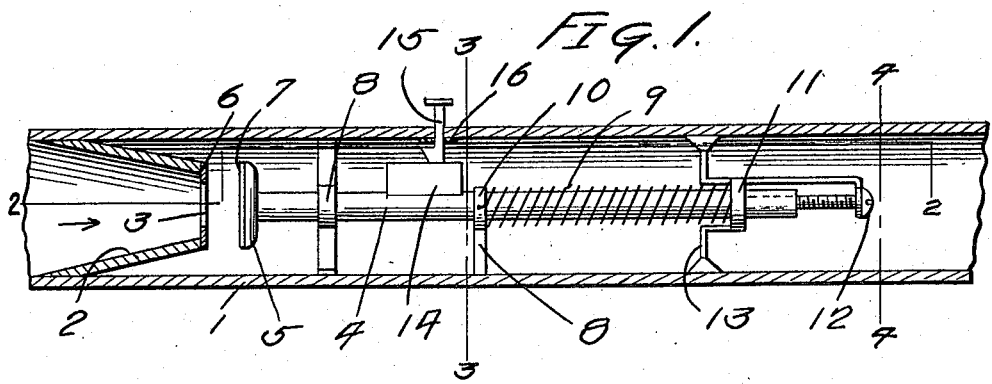
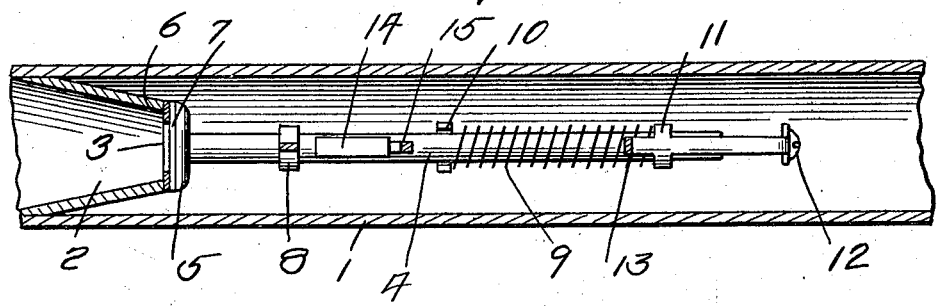
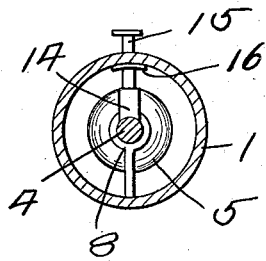 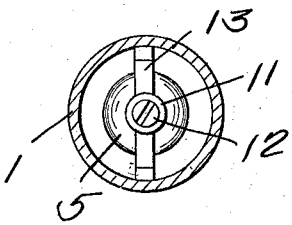
Inventor
G. C. Kail

UNITED STATES PATENT OFFICE.

GROVER C. KAIL, OF JEWETT, OHIO.

AUTOMATIC GAS-SHUT-OFF VALVE.

1,218,089.      Specification of Letters Patent.      Patented Mar. 6, 1917.

Application filed June 7, 1915. Serial No. 32,714.

*To all whom it may concern:*

Be it known that I, GROVER C. KAIL, a citizen of the United States, residing at Jewett, in the county of Harrison, State of Ohio, have invented certain new and useful Improvements in Automatic Gas - Shut - Off Valves; and I do hereby declare the following to be a full, clear, and exact description of the invention, such as will enable others skilled in the art to which it appertains to make and use the same.

This invention relates to an automatic gas shut off valve.

An object of the invention resides in the provision of a device by means of which the gas in the pipes in the house will be automatically shut off should the pressure drop below a certain point or should the gas be completely stopped and then turned on again.

A further object of the invention resides in so constructing the device that after the gas has been once shut off it will remain so until released by the person who desires to use the same.

A further object of the invention resides in so constructing the device that it may be adjusted to be operable by various pressures.

With these and other objects in view, such as will appear as the description progresses, my invention comprises the combination and arrangement of parts as set forth in and falling within the scope of the appended claim.

Referring to the drawing:

Figure 1 is a longitudinal sectional view of my device.

Fig. 2 is a section on line 2—2 of Fig. 1, looking in the direction of the arrow.

Fig. 3 is a section on line 3—3 of Fig. 1, looking in the direction of the arrow.

Fig. 4 is a fragmental detail.

Referring to the drawing wherein like parts are indicated by like characters throughout the several views:—

In the embodiment of my invention shown in the drawing, I have provided a pipe 1 in which a frusto-conical partition 2 is located having a hole 3 located centrally thereof. The gas flowing through the pipe 1 passes through the hole 3 in the direction of the arrow.

In order that this hole 3 may be closed at the proper time, I have provided a rod 4 which has a head 5 on the end thereof which when moved into contact with the end of the partition 2 will close the hole 3 therein. When the hole is thus closed the gas will be prevented from escaping by gaskets 6 and 7, the former being on the partition 2 and the latter on the head 5. This rod 4 is mounted in a suitable bearing 8 located within the pipe 1.

In order that the head 5 may be normally pressed into engagement with the partition 2 when the gas is not flowing through the pipe 1, I have provided a coil spring 9 which encircles the rod and bears against a stop 10 on the rod at one of its ends and a collar 11 at its other end. This collar is adjustably mounted on the rod 4 and may be adjusted by means of a screw 12. Extending outwardly from the collar are braces 13 which engage the inner face of the pipe 1 and are slidable with the collar. This collar and braces assist in supporting the rod 4.

In order that the head 5 may be locked into engagement with the partition 2 when the flow of gas through the pipe 1 stops or the pressure is reduced, I have provided a block 14 which is mounted on the rod and a pin 15 which extends through the pipe and is adapted to drop by the action of gravity behind the block and thus lock the head. A gasket 16 surrounds this pin 15 and prevents the escape of gas through the hole in which it is mounted.

In operation when the gas is flowing through the pipe 1, under its normal pressure, the rod 4 will be moved against the tension of the spring so as to unseat the head 5. At this time the pin 15 rests upon the upper face of the block 14. Now when the gas is shut off or the pressure reduced beyond a certain point the spring 9 will act and move the rod 4 so as to seat the head 5 and close the opening 3. When the head moves into this position the pin 15 will drop in behind the block 14 and will lock it in such position so that when the gas is subsequently turned on or the pressure increased it will not be unseated. The pin 15 will be securely held in such position because of the fact that the lower end thereof is wedge-shaped. The screw 12 may be adjusted so as to vary the tension of the spring 9 and thus vary the necessary pressure for operating the rod. When it is desired to turn the gas on again or to allow it to flow through the pipe 1 it is only necessary for the user to draw the pin 15 outwardly at which time the pressure of the gas will unseat the head 5.

This device is particularly useful where the pressure of the gas is reduced at night or where the gas is entirely cut off. It will be obvious that the gas may be left burning with no danger of its escaping after the reduction of pressure as immediately upon the said reduction to a point where the light would be extinguished the head will seat and the flow of the gas be automatically stopped.

While I have illustrated and described a particular embodiment of my invention, I have merely done so for the sake of convenience and I do not wish to be limited to that particular embodiment as it is obvious that numerous changes may be made within the details of construction thereof without in any way departing from the spirit of the invention or exceeding the scope of the appended claim.

What I claim is:—

In an automatic gas shut off valve, the combination with a pipe having a partition therein in which a hole is formed, of a rod slidably mounted in said pipe and having a head on one end thereof for closing said hole, a coil spring encircling said rod, a stop to which the spring is secured at one of its ends, a collar adjustably mounted on said rod and having the other end of the spring secured thereto, braces formed on the collar and slidably engaged with the inner face of the pipe, means for adjusting the collar accessible from the end of the pipe and without removing the rod from said pipe, said means comprising an arm projecting from one side of the collar and having an end projecting over the end of the rod, a screw passing through the end of the arm and engaging in the end of the rod, and means for positively locking the head in engagement with the partition.

In testimony whereof, I affix my signature, in the presence of two witnesses.

GROVER C. KAIL.

Witnesses:
HARRY G. RYDER,
J. C. McMANUS.

Copies of this patent may be obtained for five cents each, by addressing the "Commissioner of Patents, Washington, D. C."